United States Patent
Manuelian et al.

(10) Patent No.: US 7,751,412 B1
(45) Date of Patent: Jul. 6, 2010

(54) VIRTUAL CIRCUIT AUTOMATIC CONFIGURATION

(75) Inventors: George Manuelian, Mountain View, CA (US); Vince Mammoliti, Mississauga (CA); Charles Yager, Cupertino, CA (US); Kumar Reddy, San Jose, CA (US); Megan Minghua Bao, Palo Alto, CA (US); Ramesh R, Nelamangala (IN)

(73) Assignee: Cisco Technology, Inc., San Jose, CA (US)

( * ) Notice: Subject to any disclaimer, the term of this patent is extended or adjusted under 35 U.S.C. 154(b) by 1673 days.

(21) Appl. No.: 10/350,275

(22) Filed: Jan. 22, 2003

(51) Int. Cl.
*H04L 12/28* (2006.01)
(52) U.S. Cl. .................... 370/397; 370/395.2
(58) Field of Classification Search .......... 370/358, 370/397–399, 395.21, 395.2, 395.3
See application file for complete search history.

(56) References Cited

U.S. PATENT DOCUMENTS

| | | | | |
|---|---|---|---|---|
| 6,222,844 B1* | 4/2001 | Han et al. | | 370/397 |
| 6,314,105 B1* | 11/2001 | Luong | | 370/395.2 |
| 6,597,689 B1* | 7/2003 | Chiu et al. | | 370/354 |
| 6,707,820 B1* | 3/2004 | Arndt et al. | | 370/395.2 |
| 6,873,628 B1* | 3/2005 | Tang | | 370/480 |
| 6,990,110 B2* | 1/2006 | Nattkemper et al. | | 370/397 |
| 2001/0015978 A1* | 8/2001 | Blanset et al. | | 370/395 |
| 2002/0054600 A1* | 5/2002 | Tanaka et al. | | 370/399 |
| 2002/0126674 A1* | 9/2002 | Hemmady | | 370/395.1 |
| 2004/0090970 A1* | 5/2004 | Sanchez et al. | | 370/397 |
| 2005/0213581 A1* | 9/2005 | Ah Sue | | 370/395.2 |
| 2006/0165086 A1* | 7/2006 | Wilson et al. | | 370/395.2 |

OTHER PUBLICATIONS

"White Papers, Redback SMS Platform Overview", pp. 1-20, http://www.redback.com/en-US/resources/home_resources.jsp?menu=menu.html&main=/en-us/whitepp/wp_sms.html.

* cited by examiner

*Primary Examiner*—Steven H Nguyen
*Assistant Examiner*—Kerri M Rose
(74) *Attorney, Agent, or Firm*—BainwoodHuang

(57) ABSTRACT

New virtual circuits (VCs) may be configured by a router as they are brought up, eliminating any need for preconfiguration. Specific ports may be set up to autoconfigure (and certain ports may be excluded for security or other reasons). When a packet from an unconfigured VC arrives, the router may then determine if the source VC it is a valid VC, such as whether it is in a valid range and unique to the interface. The Operating System may then send a message configuring the VC once it has been determine it is valid. The configuration used may be one that is part of a standard template. The next time a packet comes in from the VC, it may then be handled in accordance with the template.

43 Claims, 5 Drawing Sheets

VIRTUAL CIRCUIT AUTOMATIC CONFIGURATION

FIELD OF THE INVENTION

The present invention relates to the field of virtual circuits in computer networks. More specifically, the present invention relates to the automatic configuration of virtual circuits in a computer network.

BACKGROUND OF THE INVENTION

A virtual circuit (VC) is a network connection that appears to the user to be set aside solely for him, even though in actuality the physical link may be shared with many other users. One termination point of a virtual circuit is typically a router controlled by the Internet Service Provider (ISP) granting access to the user.

Digital Subscriber Line (DSL) technology has been growing in popularity as an alternative to slower Internet connections, such as dial-up access, and as an alternative to expensive and high-maintenance faster Internet connections, such as T1 lines. FIG. 1 is a diagram illustrating a typical DSL system. A user 100 may connect via Customer Premises Equipment (CPE) 102, such as a DSL modem, to a Digital Subscriber Line Access Multiplexor (DSLAM) 104. The DSLAM 104 may aggregate many different physical connections (such as from other users 106, 108) into a single physical line 110, which terminates at a router or gateway 112.

It is common practice for each user 100 to be assigned a separate virtual circuit (VC), such as by using an Asynchronous Transfer Mode (ATM) VC. Thus, while there is only one physical line 110 between the DSLAM 104 and the router 112, there may be many virtual circuits.

Traditionally, this router 112 may be configured to receive virtual circuits by manually configuring each virtual circuit as it is brought up (to the point where it is recognized by the router-configuring additional parameters is a separate issue). While this may work fine for instances where many subscribers can share the same VC (resulting in a small number of VC's to be configured on the router) such as in the Level 2 Tunneling Protocol (L2DP), in the DSL world, where each VC represents a single subscriber, this manual configuration may be extremely time consuming. It is not unusual for a single router to manage 8,000 or more subscribers at once. Obviously, configuring each virtual circuit manually as it is brought up requires significant effort, and can result in an unwieldy configuration file.

When a virtual circuit is brought up, typically information regarding the virtual circuit must be passed from the DSLAM 104 to the router 112. Since often these components are operated by separate companies, the information is usually passed via e-mail or voice communication, and then manually configured on the router side. The information typically comprises a virtual circuit number, which must be unique and must be the same on both ends. It also comprises the type of ATM VC to be used, such as Unspecified Bit Rate (UBR), Variable Bit Rate (VBR), and Committed Bit Rate (CBR), a Quality of Service (QoS) level, indicating the amount of bandwidth to allocate to the VC, and whether packets on the circuit will be snap-encapsulated or MUX encapsulated. Although it is often necessary to inform the router of all this information, it is not necessary that all be transmitted. Certain "packages" may be set up such that only the name of the package need to be identified, such as "gold" for the best package, along with the VC number. Nevertheless, each VC must still be manually configured on the router.

One potential solution to this problem would be to preconfigure a range of virtual circuits. A standard package could be assumed and the router could, for example, set up a range of a hundred VCs, even though user's have not been assigned to the VCs yet. The problem with this, however, is that the range is contiguous and VCs typically aren't assigned in a strict order.

Another potential solution would be to use the Interim Local Management Interface (ILMI) protocol. ILMI facilitates network-wide auto-configuration by allowing adjacent nodes to determine each other's characteristics. Thus, the router could talk with a DSLAM via ILMI and incorporate all of its VC configuration information. This solution works well if a single enterprise owns both the SLAM and the router. However, as discussed above that is typically not the case, so this solution is not a desirable one.

What is needed is a solution that allows for the provisioning of a large number of subscribers using virtual circuits in a quick, easy, and error-free way.

BRIEF DESCRIPTION

New virtual circuits (VCs) may be configured by a router as they are brought up, eliminating any need for preconfiguration. Specific ports may be set up to autoconfigure (and certain ports may be excluded for security or other reasons). When a packet from an unconfigured VC arrives, the router may then determine if the source VC it is a valid VC, such as whether it is in a valid range and unique to the interface. The Operating System may then send a message configuring the VC once it has been determine it is valid. The configuration used may be one that is part of a standard template. The next time a packet comes in from the VC, it may then be handled in accordance with the template.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
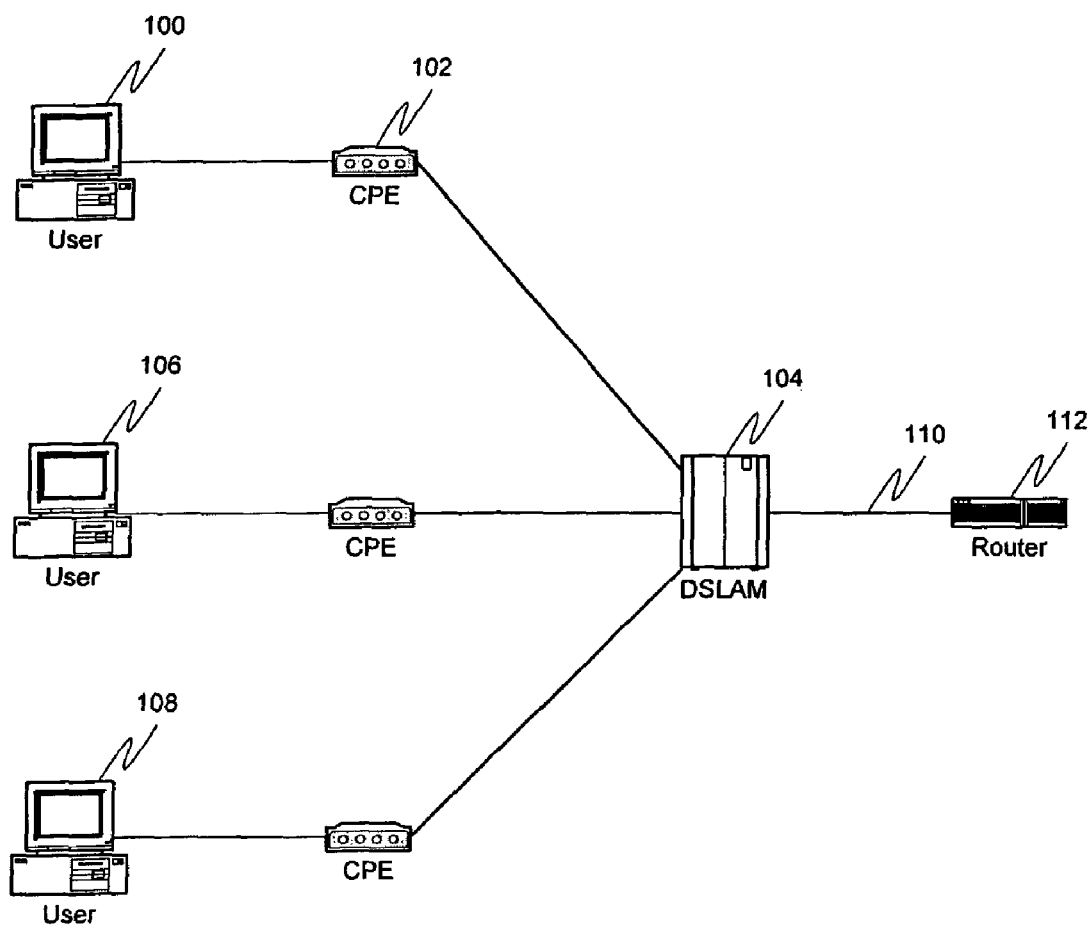
FIG. 1 is a diagram illustrating a typical DSL system.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems, computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention may be used in a network of ATM devices. However, one of ordinary skill in the art will recognize that the present invention may be easily modified to be compatible with other types of network devices as well, and the present invention should not be read as being limited to ATM devices.

The present invention may be discussed in the context of running on a router. However, one of ordinary skill in the art will recognize that a router should be interpreted as any device or software that performs routing functions. Thus, router should be read to include devices such as gateways, among others.

The present invention automatically configures new VCs as they are brought up, thus eliminating any need for preconfiguration. Specific ports may be set up to autoconfigure (and certain ports may be excluded for security or other reasons). When a packet from an unconfigured VC arrives (as determined by the packet header), the presentation automatically puts it in what may be termed a "guest box", which indicates it is unknown. The operating system on the router may then determine if the source VC it is a valid VC, such as whether it is in a valid range and unique to the interface. The OS may then send a message configuring the VC once it determines the VC is valid. The configuration used may be one that is part of a standard template. The next time a packet comes in from the VC, it may then be handled in accordance with the template. One of ordinary skill in the art will recognize that the first packet may be "lost", i.e. it never reaches its destination, because it is used to configure the VC in the first place. However, this is a fair tradeoff for the amount of time and resources necessary to manually configure each VC.

The standard template of course may not be the correct configuration for the VC. For example, the standard template may be a "silver" package when the user has signed up for the "gold". Subsequent packets may be used to reconfigure the VC to the correct package, as well as to detect other settings not part of the "package" definition, such as whether the PPP OA or PPP OE protocol is being used.

In addition to the time and resource savings described above, the present invention also allows for VC oversubscription. In an embodiment of the present invention, unused VCs may be expired after a preset amount of time. For example, the ISP may indicate that any VCs that are unused for a day should be expired. Since interfaces are limited as to the number of VCs on the interface and user's typically spend only a fraction of their time online, this allows the ISP to oversubscribe the number of virtual circuits, allowing, for example, 16,000 customers to utilize an interface that can only handle 8,000 VCs.

The present invention also may speed up the boot-up time for the router. In the past, when a router was restarted, a file containing all the configuration information needed to be reloaded, resulting in a slow boot-up time. This time delay can be costly, especially if the router was shut off unexpectedly (such as from a power outage) and/or during heavy traffic usage. By utilizing the present invention, the boot-up time is greatly reduced. There is no necessity to reload any configuration information when the router is restarted. The router will simply automatically detect the VCs as the new traffic comes in, and the first to be brought up will be the ones that had traffic first.

Figure 2:
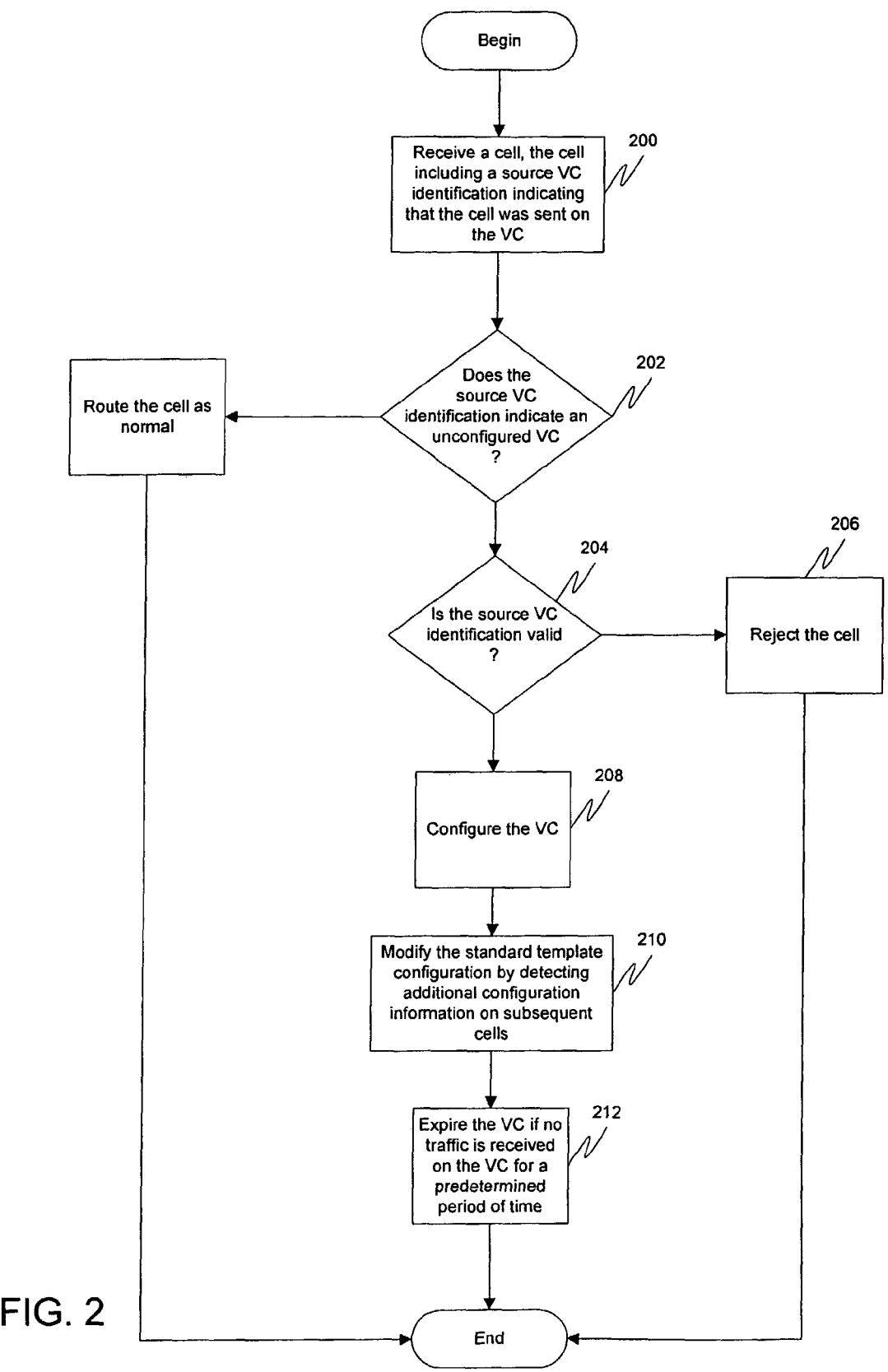
FIG. 2 is a flow diagram illustrating a method for automatically configuring a virtual circuit in accordance with an embodiment of the present invention.

FIG. 2 is a flow diagram illustrating a method for automatically configuring a virtual circuit in accordance with an embodiment of the present invention. The method may be executed by a router and may only be performed on specific ports on the router. At 200, a packet may be received, the packet including a source VC identification indicating that the packet was sent on the VC. At 202, it may be determined if the source VC identification indicates an unconfigured VC. At 204, it may be determined whether the source VC identification is valid, and if not, then at 206 the packet may be rejected. Determining whether it is valid may include determining whether it is unique to an interface, is within a preset valid range, and/or the number of VCs on the interface is less than a maximum allowable number of VCs. At 208, the VC may be configured if the source VC identification indicates an unconfigured VC. This may include applying a standard template configuration to the VC so that it is brought to the point where it can be recognized by a router. At 210, the standard template configuration may be modified by detecting additional configuration information on subsequent packets arriving on the VC. At 212, the VC may be expired if no traffic is received on the VC for a predetermined period of time.

Figure 3:
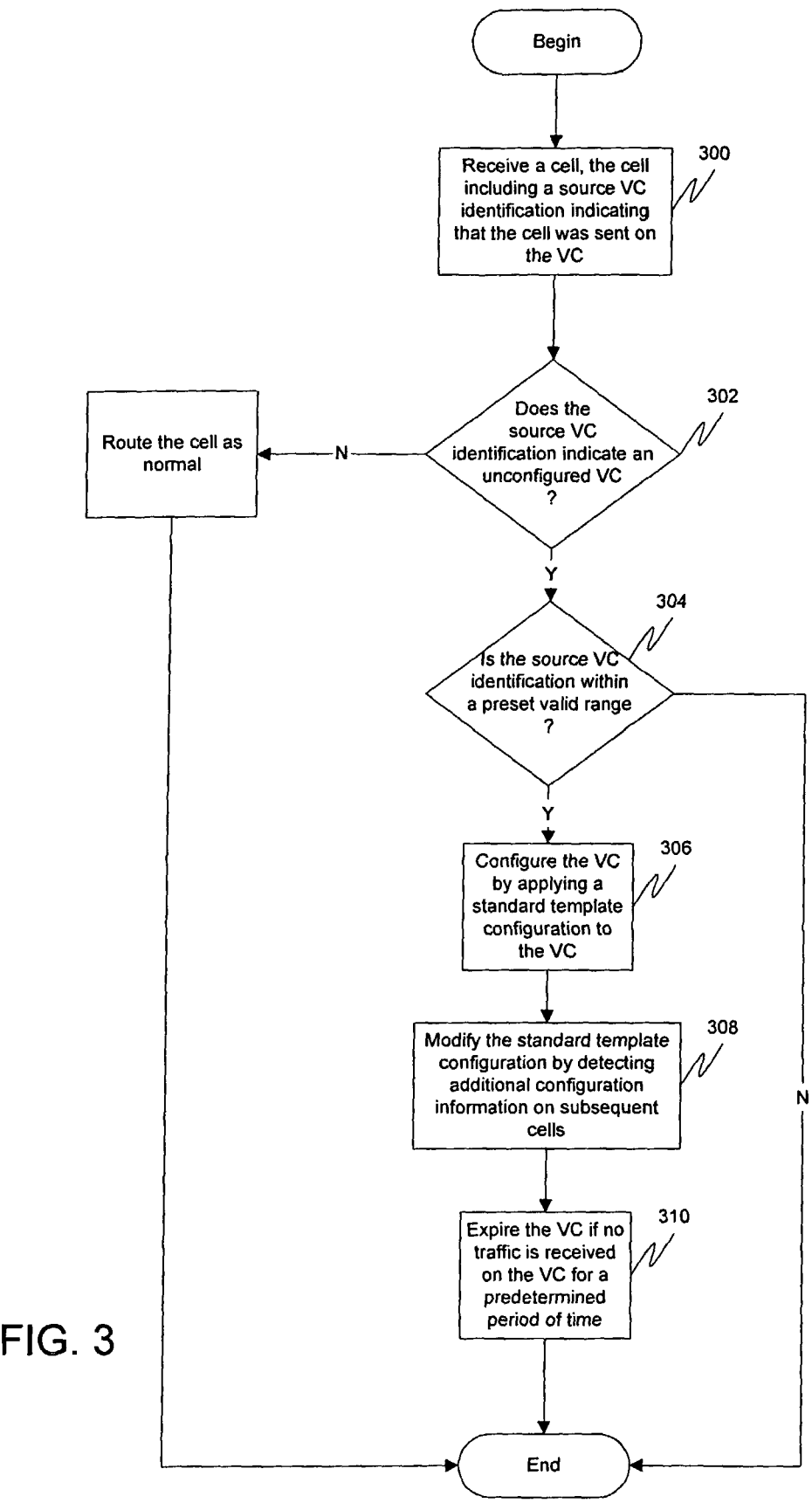
FIG. 3 is a flow diagram illustrating a method for automatically configuring a virtual circuit in an Asynchronous Transfer Mode (ATM) network where each VC is unique to an individual subscriber, in accordance with an embodiment of the present invention.

FIG. 3 is a flow diagram illustrating a method for automatically configuring a virtual circuit in an Asynchronous Transfer Mode (ATM) network where each VC is unique to an individual subscriber, in accordance with an embodiment of the present invention. At 300, a packet may be received, the packet including a source VC identification indicating that the packet was sent on the VC. At 302, it may be determined if the source VC identification indicates an unconfigured VC. At 304, it may be determined if the source VC identification is within a preset valid range. At 306, the VC may be configured by applying a standard template configuration to the VC if the source VC identification indicates an unconfigured VC and the source VC identification is not within the preset valid range. This may include bringing the VC to the point where it can be recognized by a router. At 308, the standard template configuration may be modified by detecting additional configuration information on subsequent packets arriving on the VC. At 310, the VC may be expired if no traffic is received on the VC for a predetermined period of time.

Figure 4:
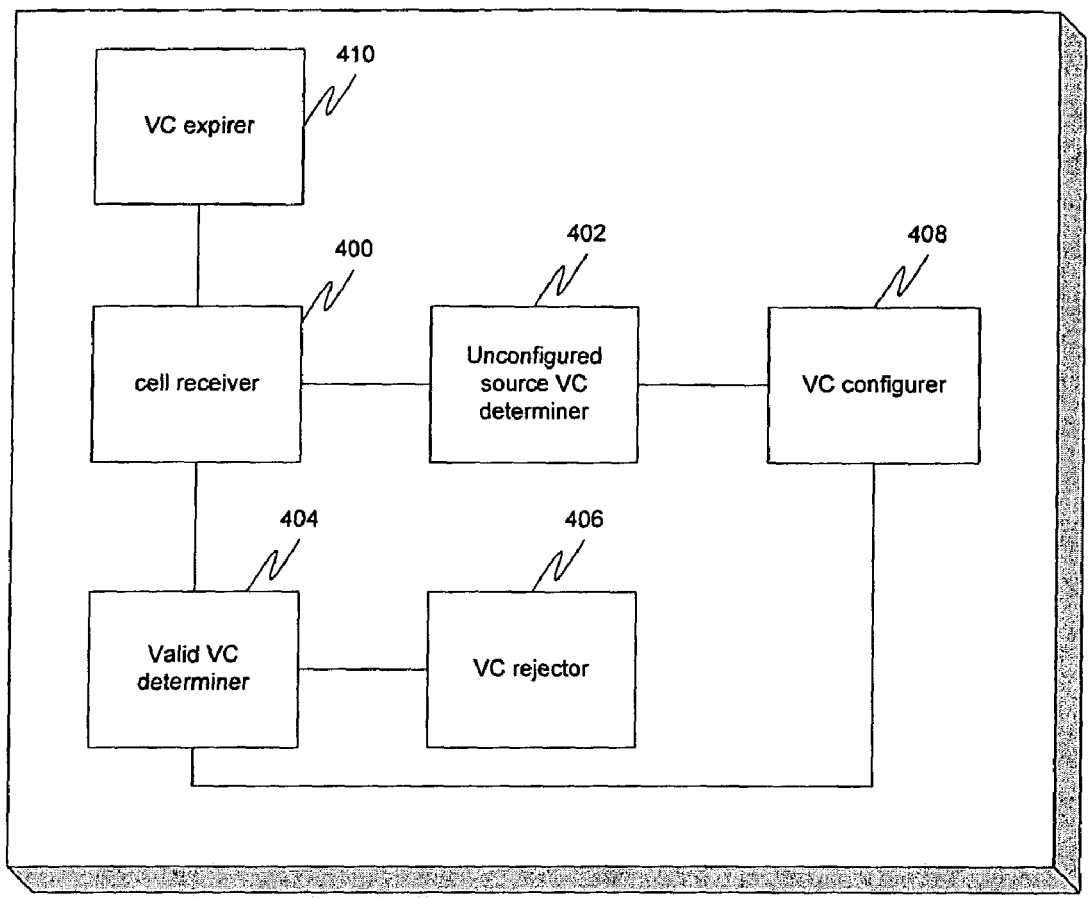
FIG. 4 is a block diagram illustrating an apparatus for automatically configuring a virtual circuit in accordance with an embodiment of the present invention.

FIG. 4 is a block diagram illustrating an apparatus for automatically configuring a virtual circuit in accordance with an embodiment of the present invention. The apparatus may be a router. A packet receiver 400 may receive a packet, the packet including a source VC identification indicating that the packet was sent on the VC. An unconfigured source VC determiner 402 coupled to the packet receiver 400 may determine if the source VC identification indicates an unconfigured VC. A valid VC determiner 404 coupled to the packet receiver 400 may determine whether the source VC identification is valid, and if not, then a VC rejector 406 coupled to the valid VC determiner 404 may reject the packet. Determining whether it is valid may include determining whether it is unique to an interface, is within a preset valid range, and/or the number of VCs on the interface is less than a maximum allowable number of VCs. A VC configurer 408 coupled to the unconfigured source VC determiner 402 and the valid VC determiner 404 may configure the VC if the source VC identification indicates an unconfigured VC. This may include applying a standard template configuration to the VC so that it is brought to the point where it can be recognized by a router. A VC expirer 410 coupled to the packet receiver 400 may expire the VC if no traffic is received on the VC for a predetermined period of time.

Figure 5:
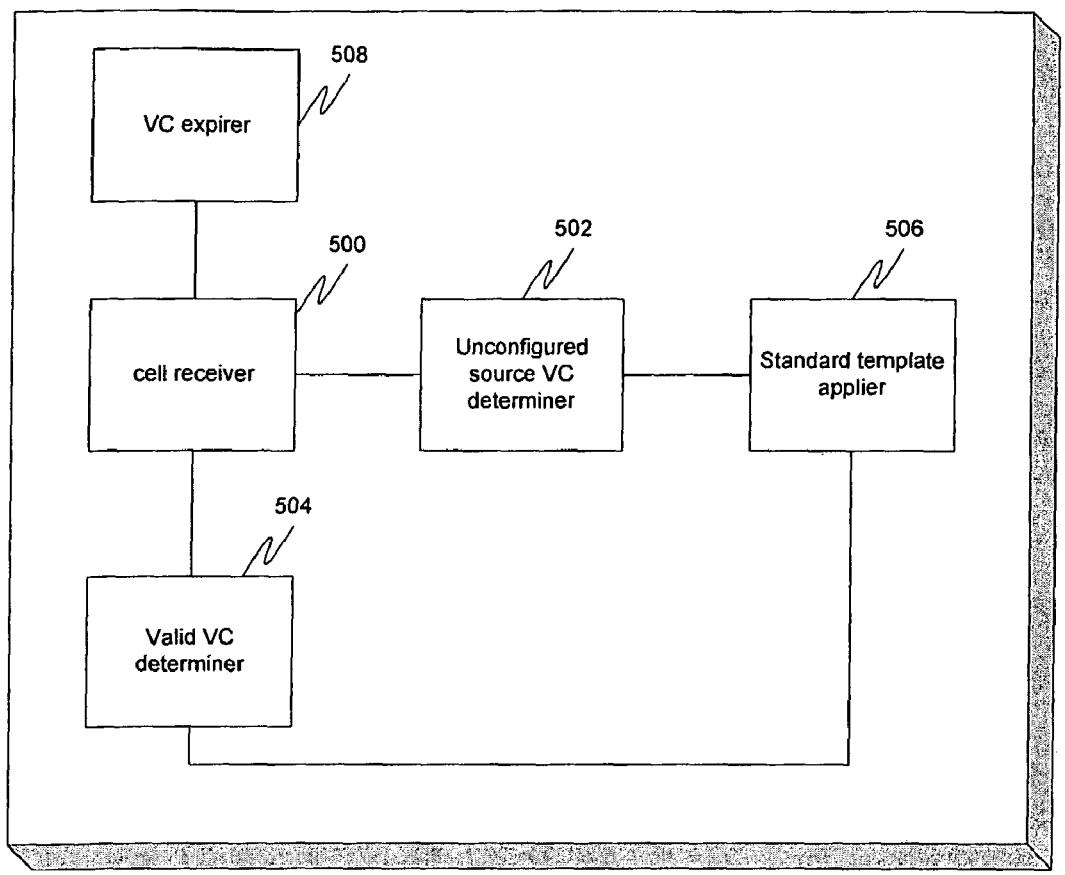
FIG. 5 is a block diagram illustrating an apparatus for automatically configuring a virtual circuit in an Asynchronous Transfer Mode (ATM) network where each VC is unique to an individual subscriber, in accordance with an embodiment of the present invention.

FIG. 5 is a block diagram illustrating an apparatus for automatically configuring a virtual circuit in an Asynchronous Transfer Mode (ATM) network where each VC is unique to an individual subscriber, in accordance with an embodiment of the present invention. A packet receiver 500 may receive a packet, the packet including a source VC identification indicating that the packet was sent on the VC. An unconfigured source VC determiner 502 coupled to the packet receiver 500 may determine if the source VC identification indicates an unconfigured VC. A valid VC determiner 504 coupled to the unconfigured source VC determiner 502 may determine if the source VC identification is within a preset valid range. A standard template applier 506 coupled to the valid VC determiner 504 and to the unconfigured source VC determiner 502 may apply a standard template configuration to the VC if the source VC identification indicates an unconfigured VC and the source VC identification is not within the preset valid range. This may include bringing the VC to the point where it can be recognized by a router. A VC expirer 508 coupled to the packet receiver 500 may expire the VC if no traffic is received on the VC for a predetermined period of time.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for automatically configuring a virtual circuit (VC), comprising:
   receiving a packet, by a router, the router configured as being absent a VC configuration for the packet source, the packet including a source VC identification indicating that the packet was sent on the VC;
   determining, by the router if the source VC identification indicates an unconfigured VC; and
   configuring the VC, by the router, if the source VC identification indicates an unconfigured VC;
   further comprising:
   determining whether the source VC identification is valid if the source VC identification indicates an unconfigured VC; and
   rejecting the VC if the source VC identification is invalid;
   wherein the configuring includes bringing the VC to the point that it can be recognized by a router; and
   wherein the determining whether the source VC identification is valid includes determining whether the source VC identification is within a preset valid range.

2. The method of claim 1, wherein the determining whether the source VC identification is valid includes determining whether the source VC identification is unique to an interface.

3. The method of claim 1, wherein the determining whether the source VC identification is valid includes determining whether the number of VCs on an interface is less than a maximum allowable number of VCs.

4. The method of claim 1, further comprising expiring the VC if no traffic is received on the VC for a predetermined period of time.

5. The method of claim 1, wherein the configuring includes applying a standard template configuration to the VC.

6. The method of claim 5, further comprising modifying the standard template configuration by detecting additional configuration information on subsequent packets arriving on the VC.

7. The method of claim 6, wherein:
   applying a standard template configuration to the VC comprises applying, by the router, a first quality of service to the VC for the exchange of a packet at the first quality of service; and
   modifying the standard template configuration by detecting additional configuration information on subsequent packets arriving on the VC comprises:
   detecting, by the router, a second quality of service associated with a subsequent packet received by the router, the second quality of service being distinct from the first quality of service; and
   applying, by the router, the second quality of service to the VC for the exchange of subsequent packets at the second quality of service.

8. The method of claim 1, wherein the method is executed by a router.

9. The method of claim 8, wherein the method is only performed on specific ports of the router.

10. The method of claim 1, wherein the method is executed in a network where each VC is unique to an individual subscriber.

11. A method for automatically configuring a virtual circuit (VC) in an Asynchronous Transfer Mode (ATM) network where each VC is unique to an individual subscriber, comprising:
    receiving a packet, by a router, the router configured as being absent a VC configuration for the packet source, the packet including a source VC identification indicating that the packet was sent on the VC;
    determining, by the router, if the source VC identification indicates an unconfigured VC;
    determining, by the router, whether the source VC identification is within a preset valid range; and
    configuring, by the router, the VC by applying a standard template configuration to the VC if the source VC identification indicates an unconfigured VC and the source VC identification is not within the preset valid range;

wherein the configuring includes bringing the VC to the point that it can be recognized by the router.

12. The method of claim 11, further comprising expiring the VC if no traffic is received on the VC for a predetermined period of time.

13. The method of claim 11, further comprising modifying the standard template configuration by detecting additional configuration information on subsequent packets arriving on the VC.

14. A router capable of automatically configuring a virtual circuit (VC), comprising:
   a packet receiver designed to receive a packet, the packet including a source VC identification indicating that the packet was sent on the VC, the router configured as being absent a VC configuration for the packet source;
   an unconfigured source VC determiner designed to determine if the source VC identification indicates an unconfigured VC; and
   a VC configurer designed to configure the VC if the source VC identification indicates an unconfigured VC;
   wherein the VC configurer is further designed to bring the VC to the point that it can be recognized by the router;
   further comprising:
   a valid VC determiner designed to determine whether the source VC identification is valid if the source VC identification indicates an unconfigured VC; and
   a VC rejector designed to reject the VC if the source VC identification is invalid;
   wherein the valid VC determiner is further designed to determine whether the source VC identification is within a preset valid range.

15. The router of claim 14, wherein the valid VC determiner is further designed to determine whether the source VC identification is unique to an interface.

16. The router of claim 14, wherein the valid VC determiner is further designed to determine whether the number of VCs on an interface is less than a maximum allowable numbers of VCs.

17. The router of claim 14, further comprising a VC expirer designed to expire the VC if no traffic is received on the VC for a predetermined period of time.

18. The router of claim 14, wherein the VC configurer is further designed to apply a standard template configuration to the VC.

19. A router for automatically configuring a virtual circuit (VC), comprising:
   means for receiving, by the router, a packet, the packet including a source VC identification indicating that the packet was sent on the VC, the router configured as being absent a VC configuration for the packet source;
   means for determining, by the router, if the source VC identification indicates an unconfigured VC; and
   means for configuring, by the router, the VC if the source VC identification indicates an unconfigured VC;
   wherein the means for configuring includes bringing the VC to the point that it can be recognized by a router;
   further comprising:
   means for determining whether the source VC identification is valid if the source VC identification indicates an unconfigured VC; and
   means for rejecting the VC if the source VC identification is invalid;
   wherein the means for determining whether the source VC identification is valid includes means for determining whether the source VC identification is within a preset valid range.

20. The router of claim 19, wherein the means for determining whether the source VC identification is valid includes means for determining whether the source VC identification is unique to an interface.

21. The router of claim 19, wherein the means for determining whether the source VC identification is valid includes means for determining whether the number of VCs on an interface is less than a maximum allowable number of VCs.

22. The router of claim 19, further comprising means for expiring the VC if no traffic is received on the VC for a predetermined period of time.

23. The router of claim 19, wherein the means for configuring includes means for applying a standard template configuration to the VC.

24. The router of claim 19, further comprising means for modifying the standard template configuration by detecting additional configuration information on subsequent packets arriving on the VC.

25. A router for automatically configuring a virtual circuit (VC) in an Asynchronous Transfer Mode (ATM) network where each VC is unique to an individual subscriber, comprising:
   means for receiving a packet, by the router, the packet including a source VC identification indicating that the packet was sent on the VC, the router configured as being absent a VC configuration for the packet source;
   means for determining, by the router, if the source VC identification indicates an unconfigured VC;
   means for determining, by the router, whether the source VC identification is within a preset valid range; and
   means for configuring, by the router, the VC by applying a standard template configuration to the VC if the source VC identification indicates an unconfigured VC and the source VC identification is not within the preset valid range;
   wherein the means for configuring includes means for bringing the VC to the point that it can be recognized by a router.

26. The router of claim 25, further comprising means for expiring the VC if no traffic is received on the VC for a predetermined period of time.

27. The router of claim 25, further comprising means for modifying the standard template configuration by detecting additional configuration information on subsequent packets arriving on the VC.

28. A program storage device readable by a router, tangibly embodying a program of instructions executable by the router to perform a method for automatically configuring a virtual circuit (VC), the method comprising:
   receiving a packet, by the router, the packet including a source VC identification indicating that the packet was sent on the VC, the router configured as being absent a VC configuration for the packet source;
   determining, by the router, if the source VC identification indicates an unconfigured VC; and
   configuring, by the router, the VC if the source VC identification indicates an unconfigured VC;
   wherein the configuring includes bringing the VC to the point that it can be recognized by a router; and
   wherein the determining whether the source VC identification is valid includes determining whether the source VC identification is within a preset valid range.

29. The program storage device of claim 28, wherein the method further comprises:
    determining whether the source VC identification is valid if the source VC identification indicates an unconfigured VC; and
    rejecting the VC if the source VC identification is invalid.

30. The program storage device of claim 28, wherein the determining whether the source VC identification is valid includes determining whether the source VC identification is unique to an interface.

31. The program storage device of claim 28, wherein the determining whether the source VC identification is valid includes determining whether the number of VCs on an interface is less than a maximum allowable number of VCs.

32. The program storage device of claim 28, wherein the method further comprises expiring the VC if no traffic is received on the VC for a predetermined period of time.

33. The program storage device of claim 32, wherein the method further comprises modifying the standard template configuration by detecting additional configuration information on subsequent packets arriving on the VC.

34. The program storage device of claim 33, wherein the method is only performed on specific ports of the router.

35. The program storage device of claim 28, wherein the configuring includes applying a standard template configuration to the VC.

36. The program storage device of claim 28, wherein the method is executed in a network where each VC is unique to an individual subscriber.

37. A program storage device readable by a machine, tangibly embodying a program of instructions executable by the machine to perform a method for automatically configuring a virtual circuit (VC) in an Asynchronous Transfer Mode (ATM) network where each VC is unique to an individual subscriber, the method comprising:
    receiving a packet, by the router, the packet including a source VC identification indicating that the packet was sent on the VC, the router configured as being absent a VC configuration for the packet source;
    determining, by the router, if the source VC identification indicates an unconfigured VC; determining whether the source VC identification is within a preset valid range; and
    configuring, by the router, the VC by applying a standard template configuration to the VC if the source VC identification indicates an unconfigured VC and the source VC identification is not within the preset valid range;
    wherein the configuring includes bringing the VC to the point that it can be recognized by a router.

38. The program storage device of claim 37, wherein the method further comprises expiring the VC if no traffic is received on the VC for a predetermined period of time.

39. The program storage device of claim 37, wherein the method further comprises modifying the standard template configuration by detecting additional configuration information on subsequent packets arriving on the VC.

40. A method for automatically configuring a virtual circuit (VC), comprising:
    receiving a packet, by a router, the router configured as being absent a VC configuration for the packet source, the packet including a source VC identification indicating that the packet was sent on the VC;
    determining, by the router if the source VC identification indicates an unconfigured VC;
    configuring the VC, by the router, if the source VC identification indicates an unconfigured VC;
    wherein the configuring includes bringing the VC to the point that it can be recognized by a router; and
    wherein the configuring includes applying a standard template configuration to the VC.

41. A router capable of automatically configuring a virtual circuit (VC), comprising:
    a packet receiver designed to receive a packet, the packet including a source VC identification indicating that the packet was sent on the VC, the router configured as being absent a VC configuration for the packet source;
    an unconfigured source VC determiner designed to determine if the source VC identification indicates an unconfigured VC; and
    a VC configurer designed to configure the VC if the source VC identification indicates an unconfigured VC;
    wherein the VC configurer is further designed to bring the VC to the point that it can be recognized by the router;
    wherein the VC configurer is further designed to apply a standard template configuration to the VC.

42. A router for automatically configuring a virtual circuit (VC), comprising:
    means for receiving, by the router, a packet, the packet including a source VC identification indicating that the packet was sent on the VC, the router configured as being absent a VC configuration for the packet source;
    means for determining, by the router, if the source VC identification indicates an unconfigured VC; and
    means for configuring, by the router, the VC if the source VC identification indicates an unconfigured VC;
    wherein the means for configuring includes bringing the VC to the point that it can be recognized by a router;
    wherein the means for configuring includes means for applying a standard template configuration to the VC.

43. A program storage device readable by a router, tangibly embodying a program of instructions executable by the router to perform a method for automatically configuring a virtual circuit (VC), the method comprising:
    receiving a packet, by the router, the packet including a source VC identification indicating that the packet was sent on the VC, the router configured as being absent a VC configuration for the packet source;
    determining, by the router, if the source VC identification indicates an unconfigured VC; and
    configuring, by the router, the VC if the source VC identification indicates an unconfigured VC;
    wherein the configuring includes bringing the VC to the point that it can be recognized by a router; and
    wherein the configuring includes applying a standard template configuration to the VC.

* * * * *